United States Patent [19]
Ozawa

[11] 3,961,587
[45] June 8, 1976

[54] COMBUSTION EQUIPMENT IN WHICH HUMID COMBUSTIBLE EXCRETA AND DISPOSED MATERIALS SUCH AS LIVESTOCK EXCRETA, PAPER SLUDGE CAN BE BURNT SPONTANEOUSLY

[75] Inventor: Takahisa Ozawa, Aichi, Japan

[73] Assignee: Yugenkaisha Sankyo Furnace, Owari-Asahi, Japan

[22] Filed: Nov. 20, 1974

[21] Appl. No.: 525,498

[30] Foreign Application Priority Data
Dec. 29, 1973  Japan.................................. 49-572

[52] U.S. Cl. .............................. 110/8 A; 110/49 R; 110/160
[51] Int. Cl.² ........................ F23G 5/00; F23J 5/02; F23L 17/00
[58] Field of Search.............. 110/8 R, 8 A, 160, 29, 110/13, 18 R, 49 R

[56] References Cited
UNITED STATES PATENTS

| | | |
|---|---|---|
| 1,604,271 | 10/1926 | Friedman........................... 110/160 |
| 2,284,506 | 5/1942 | Zuberbuhler........................ 110/29 |
| 2,929,342 | 3/1960 | Young.................................... 110/8 |
| 3,680,503 | 8/1972 | Danielsson........................... 110/29 |
| 3,745,942 | 7/1973 | Thompson et al....................... 110/8 |
| 3,861,332 | 1/1975 | Itasaka............................. 110/49 X |

*Primary Examiner*—Kenneth W. Sprague
*Attorney, Agent, or Firm*—Spensley, Horn & Lubitz

[57] ABSTRACT

A furnace for the combustion of moist waste materials having an axial combustion chamber surrounded in part by two communicating air jackets between which air jackets the waste combustible material is disposed, air being forced through the air jackets into the moist combustible material and combustion chamber. A second embodiment having vertical draft pipes disposed in the moist combustible material to reduce odors produced therein and having an additional air jet provided in the exhaust stream of the combustion chamber.

9 Claims, 2 Drawing Figures

COMBUSTION EQUIPMENT IN WHICH HUMID COMBUSTIBLE EXCRETA AND DISPOSED MATERIALS SUCH AS LIVESTOCK EXCRETA, PAPER SLUDGE CAN BE BURNT SPONTANEOUSLY

BACKGROUND OF THE INVENTION

1. Field of the Invention

The present invention relates to the field of furnaces for the combustion of waste materials and in particular pertains to the organization of air flow throughout such a furnace so that moist waste materials may be burned in a self-sustaining combustion without the aid of additional fuels.

2. Description of the Prior Art

The prior art has been concerned with the design and operation of furnaces capable of combusting moist waste materials, such as livestock excrement from breeding farms or paper sludge discarded by pulp mills. However, such furnaces incorporate several disadvantages such as, excessive cost for supplementary fuels necessary to sustain combustion, inability to satisfactorily eliminate odor, and the absence of suitable waste heat recovery, all of which problems have never been simultaneously resolved by a single furnace design. The common property of the waste materials intended for disposal within such furances is that such materials are themselves combustible but retain a large quantity of trapped moisture and are therefore difficult to use in a self-sustaining combustion unless a large quantity of additional fuel, such as gas or oil, is added. Furthermore, it is common that when such waste materials are burned, a large amount of offensive odor and smoke is discharged with deleterious psychological and physiological effects in the proximity of the discharge. In addition, the high temperature exhaust gas from such a furnace is commonly discharged into the atmosphere and lost without recovering the thermal energy content therein, or if a heat exchanger is provided for such recovery, an additional exhaust fan is required in order to make up for the drop of temperature in the exhaust gas caused thereby, which drop otherwise would interfere with proper exhaust draft from such a furnace.

What is needed then is a waste furnace for the combustion of moist animal excrement or paper sludge which is capable of containing a self-sustaining combustion in which the waste material is heated, dried, gasified, fired and combusted without the use of any supplemental fuel in such a manner that gases having an odor are largely eliminated and exhaust energy recovered without necessitating the use of an additional exhaust fan. The present invention simultaneously achieves all of these results.

SUMMARY OF THE INVENTION

The present invention comprises a generally cylindrical axial combustion chamber having a lower primary combustion chamber and an upper secondary combustion chamber wherein gasified waste materials are completely combusted. The lower portion of the axial combustion chamber containing the primary combustion zone is surrounded by a coaxial air jacket which communicates through radial pipes with a second toroidal air jacket. The toroidal air jacket in turn is embedded into the refractory material lining the interior of the furnace wall. The interlying toroidal space between the first coaxial air jacket and the second toroidal air jacket is substantially filled with the moist waste materials which are to be combusted. The first and second air jackets including the radial pipes or passageways communicating the same are freely supplied with a plurality of openings. In this manner air forced into the first coaxial air jacket is preheated by its proximity to the primary combustion zone and freely communicates with the entire mass of waste materials disposed within the furnace body. The first coaxial air jacket includes a plurality of upwardly directed air jets at its lower end, which jets direct a stream of forced air upward into the primary combustion zone enhancing both combustion and updraft. The moist waste material is dried, gasified, and partially combusted within the toroidal space comprising the main furnace body. The partially combusted gases move by forced convection to a central aperture in the lower portion of the axial combustion chamber. Combustion continues in the lower portion of the axial combustion chamber or in the primary combustion zone causing the heated gases to rise upward along the axis of the axial combustion chamber through a heat exchanger. A loss in velocity of the rising exhaust gases caused by the temperature drop in the heat exchanger is compensated by a plurality of upwardly directed air jets immediately upstream of the heat exchanger. The air jets are powered by a bypass line communicating with the main forced air line which delivers air into the first coaxial air jacket. Combustion is continued in the upper end of the axial combustion chamber and in a secondary combustion zone wherein the waste gases are completely oxidized. The blower or forced air lines to the exhaust accelerator jets and the first coaxial air jacket are each provided with a separate throttling device capable of restricting or substantially terminating the forced air flow. Vertical riser tubes may be provided in the toroidal space in which the waste material is contained to provide free conmunication between collected gases in the top portion of the furnace body and the central aperture provided at the bottom of the axial combustion chamber. In the preferred embodiment these riser tubes are positioned in the toroidal space in a circular pattern approximately adjacent to the first coaxial air jacket.

The novel features which are believed to be characteristic of the invention, both as to its organization and the method of operation, together with further objects and advantages thereof will be better understood from the following description to be considered in connection with the accompanying drawings in which a presently preferred embodiment of the invention is illustrated by way of example. It is to be expressly understood, however, that the drawing is for the purpose of illustration and description only, and it is not intended as a definition of the limits of the invention.

DETAILED DESCRIPTION OF THE PREFERRED EMBODIMENT

Figure 1:
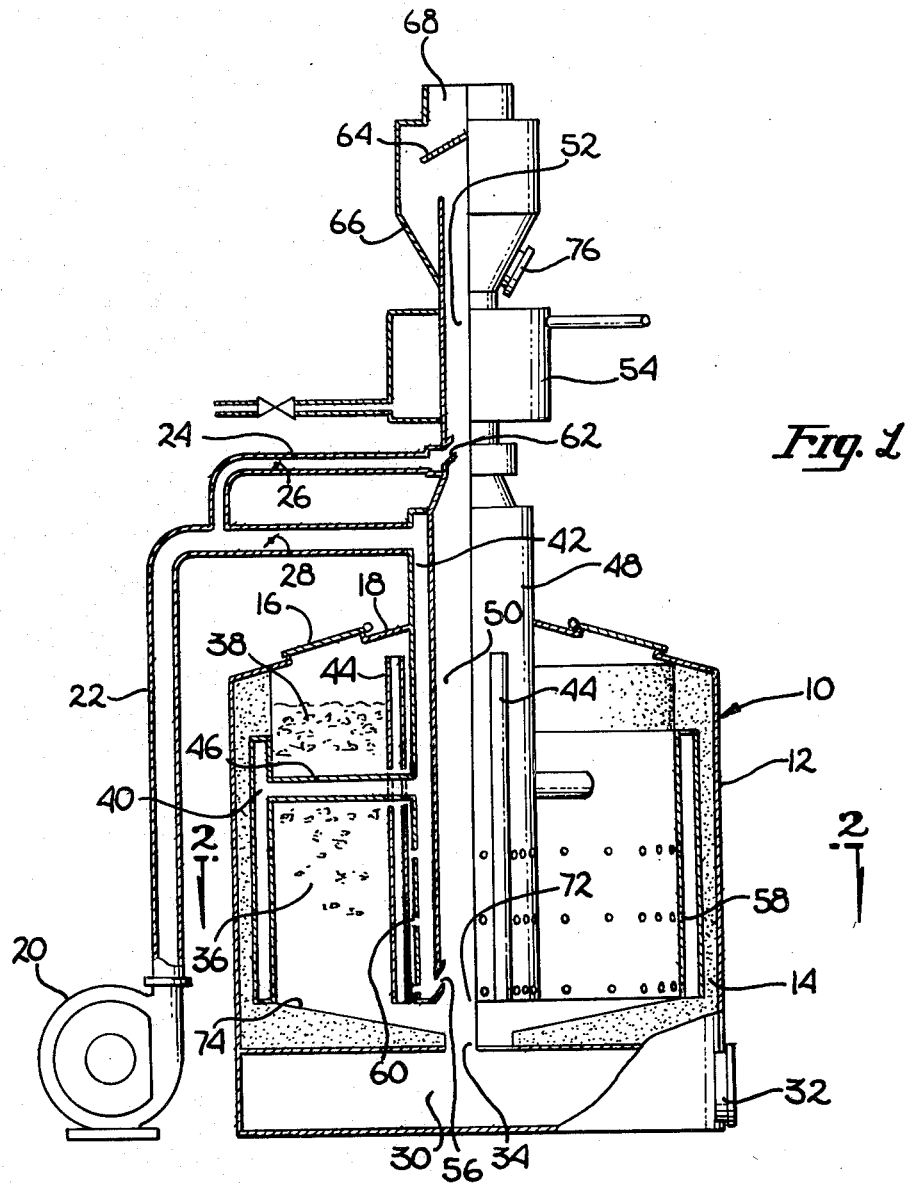
FIG. 1 is a partial cross sectional view of the present invention through a vertical plane wherein all the element of the invention and their functional relationship may be clearly seen.
Figure 2:
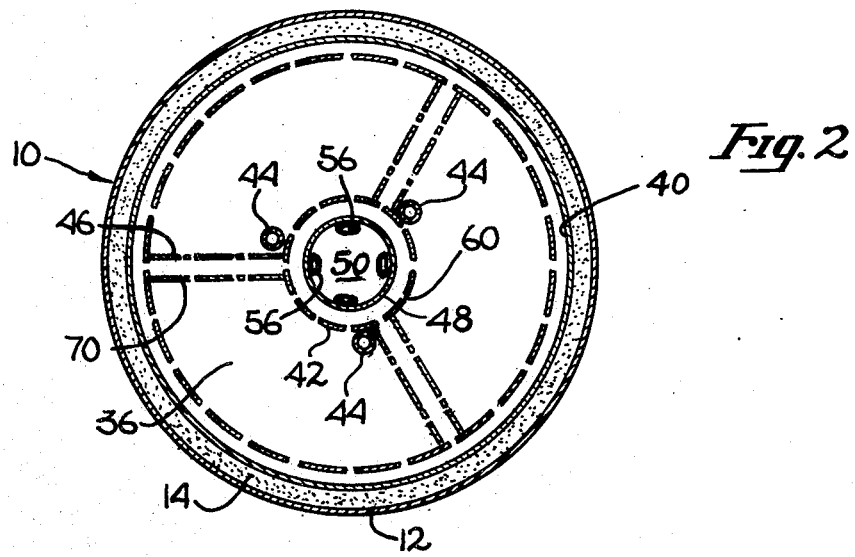
FIG. 2 is a cross sectional view through line 2-2' showing the relationship of certain elements of the present invention contained within the furnace body.

The present invention may be better understood by referring to the embodiment illustrated in FIGS. 1 and 2. The present invention comprises a central axial combustion chamber 48 the lower end of which is centered in a furnace body 10. Axial combustion chamber 48 has a coaxial air jacket 42 surrounding the lower end of chamber 48. Jacket 42 communicates by means of radial passageways of pipes 46 to a toroidal air jacket 40 embedded in a refractory material 14 lining the interior surface of furnace body 10. Furnace body 10 has a crown 18 having at least one inlet 16 through which moist waste material 38 is disposed into the toroidal space 36 between coaxial air jacket 42 and toroidal air jacket 40. Coaxial air jacket 42, passageways 46 and toroidal air jacket 40 have a plurality of apertures formed in their surfaces such that air forced through those jackets and pipes may freely communicate with the toroidal space provided for the disposed waste material. In particular, toroidal jacket 40 has apertures 58 defined in the inner surface thereof adjacent to the body of moist waste materials; passageways 46 have openings 70 defined therein; and coaxial jacket 42 has opening 60 defined therein on a surface adjacent to the moist waste material. Coaxial air jacket 42 is coupled to a conduit 22 which in turn is coupled to a blower 20 which forces a continuous blast of air into coaxial jacket 42 and those chambers with which it communicates. Throttle valve 28 is provided in conduit 22 whereby the amount of air flow into coaxial jacket 42 and consequently furnace body 10 may be controlled. Therefore, throttle valve 28 provides a means by which the pressure within the furnace body may by controlled. A plurality of upwardly directed jets 56 are provided near the lower aperture of coaxial chamber 48 which air jets aid combustion in the primary combustion zone 50 and create an upwardly directed draft. In the same manner a plurality of upwardly directed air jets 62 are provided in the exhaust stream of combustion chamber 48 immediately preceding heat exchanger 54. A continuous blast of air is provided to air jets 62 by means of a bypass conduit 24 communicating with conduit 22. An additional throttle valve 26 is provided in conduit 24 whereby the velocity and pressure of air provided to jets 62 may be controlled. Jets 62 serve to compensate for the loss of velocity or kinetic energy in the exhaust gases caused by removal of waste heat by heat exchanger 54.

In another embodiment of the present invention several gas riser pipes 44 may be provided within furnace body 10 whereby gases trapped near crown 18 may flow downwardly to the lower portion of body 10 near aperture 72 provided in the lower end of combustion chamber 48. Therefore, odor bearing gases, combustible gases and steam which tend to rise to the upper portion of furnace body 10 may be forced through riser tubes 44 to the proximity of aperture 72 of the combustion chamber without being forced to travel through moist waste materials 38.

An ash collector 30 is provided at the bottom portion of furnace body 10 whereby noncombustible ash and debris are collected through ash dumping port 34 and inclined surfaces 74 provided at the bottom portion of furance body 10. An ash removal port 32 is provided in the lower portion of side wall 12 of furnace body 10 to permit convenient removal of the noncombustible ash. Similarly, an ash collector is provided at the top of secondary combustion zone 52. In its simplest form such an ash collector may consist of a baffle 64 and a collection cone 66 whereby the velocity of the escaping exhaust gas is diverted and decreased, allowing entrained particles to settle in the lower portions of ash collector 66. Accumulations of ash in collector 66 are periodically removed through ash removal port 76.

The operation of the various elements of the present invention described above may now be understood by considering the following. First, wood or other such combustible material is placed on furnace bed 74. A fire is set and no adjustments are made in the furance until the fire has thoroughly spread across furnace bed 74. After the fire has thoroughly spread, moist waste materials 38 to be burned, such as livestock excrement, are placed into toroidal space 36 within furnace body 10. After turboblower 20 is turned on and air injected into furance 10 by means of conduit 22, throttle valve 28 and exhaust acceleration throttle value 26 are suitably adjusted. By means of these adjustments and this initial combustible charge it is possible with the present invention to continuously burn moist waste materials without the addition of supplemental fuels. Air entering coaxial jacket 42 is heated by combustion chamber 50 and is thus gradually raised in temperature. As a result, combustion within the furance is further accelerated and made self-sustaining. Heated air which does not enter torodial space 38 by means of openings 60 is supplied to outer jacket 40 by means of pipes 46 and eventually enters toroidal space 38 by means of openings 58 and 70. This preheated air dries the upper layers of moist waste materials 38 which will subsequently be burned. At lower levels of the waste materials within toroidal space 38, carbon dioxide is produced by the high temperature air injected into toroidal space 38 by means of jet holes 70, 60 and 58. Some of the carbon dioxide is further reduced as it approaches primary combustion zone 50 thereby producing carbon monoxide and other incomplete combustion gases. These gases flow into primary combustion chamber 50 and are more thoroughly oxidized with the aid of high temperature air jetted from the upwardly directed air jets 56 disposed around the lower aperture of combustion column 48. It has been observed that the termperature inside primary combustion zone 50 reaches 1200°C at the hottest region. The gases which are not completely burned in primary combustion zone 50 are carried with the exhaust stream up combustion column 48 and are thoroughly burned with the aid of air injected into the column by upwardly directed air jets 62 disposed below heat exchanger 54. In this matter a secondary combustion zone 52 is formed in the upper region of combustion region 48. Even though heat exchanger 54 is provided for utilizing waste heat and absorbing parts thereof, it does not degrade the velocity of the exhaust gases since the temperature in the region of secondary combustion zone 52 reaches temperatures as high as 1000°–1100°C and the velocity of the exhaust gases is further aided by jets 62. During the process of combustion, some steam, combustible gases or odor may be driven out of the moist waste materials as they are dried and tend to accumulate under furnace crown 18 without being drawn towards primary combustion zone 50. Therefore, vertical riser tubes 44 are disposed substantially parallel to combustion column 48 to provide an unimpeded channel for such gases through which they may be drawn towards primary combustion zone 50. Vertical riser tubes 44 therefore prevent the accumulation of any excess gases, steam or odor in the upper region of furnace body 10 in the proximity of inlet ports 16. Notwithstanding the above some odor may still be present and escape when inlet ports 16 are opened to add additional moist waste materials into the furnace. Escape of such odors may further be prevented if throttle valve 28 is closed before inlet port 16 is opened. When throttle valve 28 closes the upward exhaust draft and combustion within the furnace tends to cause a partial vacuum within toroidal space 38. When port 16 is opened movement of all gases is substantially from the exterior into toroidal space 38 through port 16 thereby driving odor bearing gases down into toroidal space 38 or riser tubes 44.

The illustrated embodiment of the present invention shown in FIGS. 1 and 2 was developed using livestock excrement and paper sludge both of which are combustible but difficult to burn due to their high water content. The embodiment disclosed is especially suitable for establishing a self-sustaining combustion of these materials. These materials are usually predried to remove their water content, and when dried may be continuously self-sustaining in a combustion having a temperature in the range of 1100° to 1300°C. In the present invention part of the heat from this combustion is used within the same furnace to preheat and dry moist waste materials which will later be combusted. Complete oxidation of strong odoriferous gases produced by this combustion is accomplished in the present invention by means of vertical gas riser tubes 44, pressure control within the furnace body by means of throttle valve 28, and by thorough combustion within secondary combustion zone 52. The present invention allows combustion of moist waste materials without the use of supplemental fuels, except as an initial charge, without the production of odoriferous gases and without the additional step of predrying such materials. Moreover, during the combustion of these materials waste heat may be effectively recovered and productively employed.

Further modifications alterations alternations of the present invention may be made by those having ordinary skill in the art without departing from the scope and spirit of the present invention.

I claim:

1. A furnace for a self sustaining combustion of moist waste material including animal excrement and paper sludge comprising a combustion chamber 48 in the center of a furnace body 10, said combustion chamber having a generally circular preheating air tank 42 on the outer circumference of said combustion chamber, said furance body having a crown 18 with inlets 16 defined therein to permit introduction of said waste material, a generally toroidal preheating air tank having apertures 58 defined therein on the inner wall, an ash dumping port 34 defined in the center of said furnace body, an ash collector 30 provided below said ash dumping port, said combustion chamber disposed vertically within said body, said ash dumping port disposed beneath said combustion chamber, said combustion chamber having a first plurality of upwardly directed air jets 56 disposed therein, said air jets communicating with said circular preheating air jacket, said circular preheating air jacket having apertures 60 defined in the outer circumferential wall and coupled to a plurality of preheating blast pipes 46, said preheating blast pipes being extended radially from said circular preheating air tank to said toroidal preheating air tank and being coupled thereto, said toroidal preheating air tank disposed within the inner wall of said furnace body, said circular preheating air tank being coupled to a turboblower 20 by a blast pipe 22.

2. The furnace of claim 1 further comprising:
a plurality of gas pass pipes 44 disposed around said circular preheating air tank, said gas pass pipes having an upper portion disposed in an upper portion of said furnace body and having a lower portion disposed near a lower portion of said combustion chamber.

3. The furnace of claim 2 further comprising:
a second plurality of upwardly directed air jets 62 disposed into said combustion chamber at a point outside of said furnace body, said second plurality of air jets communicating with said turboblower by a conduit 24.

4. The furnace of claim 3 further comprising:
a heat exchanger 54 disposed around said combustion chamber at a point outside said furnace body and above said second plurality of air jets.

5. A furnace for a self-sustaining combustion of a moist waste material comprising:
 a. means for holding said waste material defining a generally closed space;
 b. means for containing said combustion disposed at least in part in said means for holding said waste material;
 c. means for preheating and injecting air into said means for holding said waste material comprising:
  1. an air blower;
  2. a coaxial air jacket coaxially disposed about and thermally coupled to said means for containing said combustion and communicating with said closed space defined by said means for holding said waste material;
  3. a conduit communicating said air blower with said coaxial air jacket;
  4. a means for controlling the amount and pressure of said air; and
  5. a toroidal air jacket disposed within said means for holding said waste material circumscribing said waste material, communicating with said coaxial air jacket and communicating with said means for holding said waste material;
 d. means for removing a noncombustible residue formed in said means for holding said waste material, said means for removing said noncombustible material communicating with said means for holding said waste material; and
 e. means for accelerating an exhaust gas stream formed by said combustion in said means for containing said combustion, said means for accelerating said gas stream communicating with said conduit.

6. The furnace of claim 6 further comprising:
means for removing combustible gases from an upper portion of said means for holding said waste material and for delivering said combustible gases to said means for containing combustion comprising:
a plurality of vertically disposed conduits communicating said upper portion of said means for holding said waste material with said means for containing said combustion.

7. The furnace of claim 5 further comprising:
means for removing excess heat contained within said exhaust gas stream, said means for removing excess heat thermally coupled to said means for containing said combustion.

8. A furnace for a self-sustaining combustion of a moist waste material comprising:
 a. means for holding said waste material comprising a refractory enclosure defining a generally closed space having sealable ports therein for addition of said waste material;

b. means for containing said combustion comprising a vertical axial combustion column extending into said refractory enclosure, said axial combustion column having a lower and upper combustion zone;

c. means for preheating and injecting air into said refractory enclosure comprising:
  1. an air blower;
  2. a coaxial air jacket thermally coupled to said axial combustion column and communicating with said closed space defined by said refractory enclosure;
  3. a first conduit communicating said air blower with said coaxial air jacket;
  4. a first throttle valve disposed in said conduit for controlling the amount and pressure of said air; and
  5. a toroidal air jacket formed within said refractory enclosure, said toroidal air jacket circumscribing said waste materials and communicating with said coaxial air jacket and with said closed space defined by said refractory enclosure;

d. means for removing a noncombustible residue formed in said means for holding said waste material comprising:
  1. an ash chamber disposed beneath said refractory enclosure having an access port provided therein to remove accumulations of said concombustible residue; and
  2. an ash port disposed beneath said axial combustion chamber to allow said noncombustible residue within said refractory enclosure to be deposited within said ash chamber;

e. means for accelerating an exhaust gas stream formed by said combustion in said axial combustion chamber comprising:
  1. a second conduit communicating with said air blower;
  2. a second throttle valve disposed within said second conduit;
  3. a second plurality of upwardly directed air jets in communication with said second conduit, said second plurality of air jets disposed into said axial combustion chamber above said lower combustion zone; and
  4. a first plurality of upwardly directed air jets in communication with said coaxial air jacket and disposed below said lower combustion zone; and f. means for removing combustible gases from an upper portion of said means for holding said waste material and for delivering said combustible gases to said means for containing said combustion.

9. The furnace of claim 8 wherein:
said means for removing combustible gases is a plurality of vertically disposed pipes communicating said upper portion of said refractory enclosure with said lower combustion zone of said axial combustion column.

* * * * *